United States Patent
Tune et al.

(10) Patent No.: US 11,934,414 B2
(45) Date of Patent: Mar. 19, 2024

(54) SYSTEMS AND METHODS FOR GENERATING DOCUMENT SCORE ADJUSTMENTS

(71) Applicant: Canva Pty Ltd, Surry Hills (AU)

(72) Inventors: Paul Li Shern Tune, Sydney (AU); Robert Matthew Hazlewood, Sydney (AU); Victoria Tskhay, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/778,389

(22) PCT Filed: Nov. 20, 2019

(86) PCT No.: PCT/AU2019/051275
§ 371 (c)(1),
(2) Date: May 19, 2022

(87) PCT Pub. No.: WO2021/097515
PCT Pub. Date: May 27, 2021

(65) Prior Publication Data
US 2023/0004570 A1    Jan. 5, 2023

(51) Int. Cl.
*G06F 16/2457* (2019.01)
*G06N 3/08* (2023.01)
*G06V 10/82* (2022.01)
*G06V 30/41* (2022.01)

(52) U.S. Cl.
CPC .. *G06F 16/24578* (2019.01); *G06F 16/24575* (2019.01); *G06N 3/08* (2013.01); *G06V 10/82* (2022.01); *G06V 30/41* (2022.01)

(58) Field of Classification Search
CPC .......... G06N 3/045; G06N 3/08; G06N 3/048; G06F 16/24578; G06F 16/24575; G06F 16/9035; G06V 10/82; G06V 30/41
See application file for complete search history.

(56) References Cited

U.S. PATENT DOCUMENTS

| | | | |
|---|---|---|---|
| 8,554,759 B1 * | 10/2013 | Annau | G06F 16/22 707/711 |
| 10,747,400 B1 * | 8/2020 | Majumder | G06F 16/248 |
| 10,964,315 B1 * | 3/2021 | Wu | G10L 15/16 |
| 11,544,629 B2 * | 1/2023 | Koch | G06N 20/20 |

(Continued)

OTHER PUBLICATIONS

Written Opinion of the International Searching Authority for PCT/AU2019/051275, dated Jan. 31, 2020.

*Primary Examiner* — Etienne P Leroux
(74) *Attorney, Agent, or Firm* — GrowIP Law Group LLC

(57) ABSTRACT

Disclosed is a computer-implemented method for determining a score adjustment for a search document, comprising determining a first attractiveness model of a first document from one or more documents based on one or more user interactions associated with the first document; determining a second attractiveness model of a second document from one or more documents based on one or more user interactions associated with the second document; determining one or more pairwise comparisons of documents based on the first and second attractiveness models of the first and second documents; training an adjustment model based on the pairwise comparisons of documents; and inputting the search document into the adjustment model to determine the score adjustment.

20 Claims, 9 Drawing Sheets

(56) References Cited

U.S. PATENT DOCUMENTS

| | | | |
|---|---|---|---|
| 11,574,233 B2* | 2/2023 | Sankaran | G06N 3/105 |
| 2005/0108200 A1* | 5/2005 | Meik | G06F 16/954 |
| 2007/0239632 A1 | 10/2007 | Burges et al. | |
| 2009/0198654 A1* | 8/2009 | Surendran | G06Q 10/10 |
| 2010/0125570 A1 | 5/2010 | Chapelle et al. | |
| 2011/0029517 A1 | 2/2011 | Ji et al. | |
| 2012/0143789 A1* | 6/2012 | Wang | G06F 16/951 |
| | | | 707/E17.014 |
| 2013/0054566 A1* | 2/2013 | Xu | G06F 16/9535 |
| | | | 707/E17.069 |
| 2015/0120722 A1* | 4/2015 | Martín Martínez et al. | |
| | | | G06F 16/9535 |
| | | | 707/733 |
| 2015/0195126 A1* | 7/2015 | Vasseur | G06N 99/00 |
| | | | 370/218 |
| 2017/0097948 A1* | 4/2017 | Kerr | G06F 16/532 |
| 2018/0039620 A1 | 2/2018 | Ciulla et al. | |
| 2018/0189292 A1 | 7/2018 | Grace, Jr. et al. | |
| 2018/0285742 A1* | 10/2018 | Makino | G06F 16/24542 |
| 2018/0341866 A1 | 11/2018 | Huang et al. | |
| 2019/0095301 A1* | 3/2019 | Sim | G06F 11/2263 |
| 2019/0266283 A1 | 8/2019 | Shukla et al. | |
| 2020/0004819 A1* | 1/2020 | Indenbom | G06N 7/01 |
| 2020/0388021 A1* | 12/2020 | Song | G06N 3/045 |

* cited by examiner

SYSTEMS AND METHODS FOR GENERATING DOCUMENT SCORE ADJUSTMENTS

CROSS-REFERENCE TO RELATED APPLICATION

This application is a U.S. National Stage Application that claims the benefit of the filing date of International PCT Application No. PCT/AU2019/051275, filed Nov. 20, 2019, which is hereby incorporated by reference in its entirety.

FIELD OF THE INVENTION

The present disclosure is directed to searching and ranking documents. Specifically, the present disclosure is directed to generating and applying document score adjustments in search results.

BACKGROUND OF THE INVENTION

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Generally speaking, searching involves ranking (or scoring) documents according to a query. Some approaches to searching allow for a two-step process: an initial document score is generated by a search engine based on the search query and, following this, a document score adjustment (also referred to as a document boost) is applied to generate an adjusted document score. Applying a document score adjustment to the base scores generated by the search engine allows the order in which documents are returned to be adjusted, for example to elevate documents that are deemed to be more important, popular, profitable, or for any other reason. Traditionally, document score adjustment is performed by applying rules to the base score returned by a search engine. These rules are typically handcrafted by a search relevance engineer with domain expertise.

Such handcrafting means that it is often up to the search relevance engineer to determine whether a rule is accurately adjusting scores of documents in a search. However, the rules are often difficult to apply across a range of documents and it can be difficult to determine whether the rules operate accurately for a large number of documents. Further handcrafting rules requires a significant amount of domain knowledge which if configured incorrectly can result in contradictory rules.

Some approaches to automation exist, however they can be quite computationally inefficient because such approaches often require multiple comparisons between documents, particularly in order to determine an attractiveness of a document (that is, a perceived relevance of the document by a user). Therefore there exists a need for an automated way of adjusting scores of documents that is computationally efficient.

SUMMARY OF THE INVENTION

Described herein is a computer-implemented method for determining a score adjustment for a search document, comprising: determining a first attractiveness model of a first document from one or more documents based on one or more user interactions associated with the first document; determining a second attractiveness model of a second document from one or more documents based on one or more user interactions associated with the second document; determining one or more pairwise comparisons of documents based on the first and second attractiveness models of the first and second document; determining training an adjustment model based on the pairwise comparisons of documents; and inputting the search document into the adjustment model to determine the score adjustment.

Described herein is a computer processing system comprising: a processing unit; a communication interface; a non-transient storage medium readable by a processor, the storage medium storing instructions executable by one or more processors to cause the one or more processors to: determine a first attractiveness model of a first document from one or more documents based on one or more user interactions associated with the first document; determine a second attractiveness model of a second document from one or more documents based on one or more user interactions associated with the second document; determine one or more pairwise comparisons of documents based on the first and second attractiveness models of the first and second documents; train an adjustment model based on the pairwise comparisons of documents; and input the search document into the adjustment model to determine the score adjustment.

Figure 1:
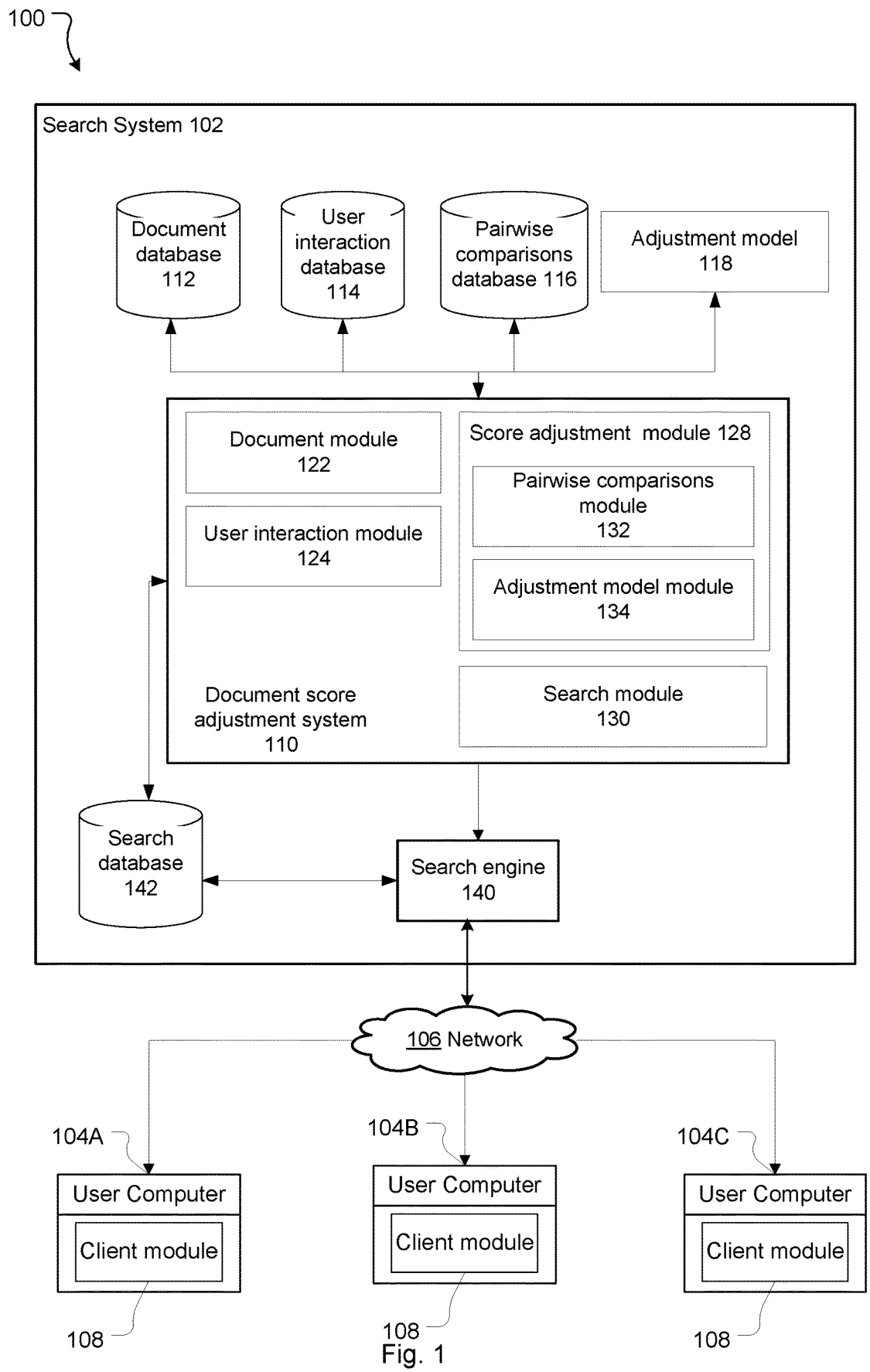
FIG. 1 illustrates an example search system that includes a system for generating document score adjustments.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

In the following description, for the purposes of explanation, numerous specific details are set forth in order to provide a thorough understanding of the present invention.

It will be apparent, however, that the present invention may be practiced without these specific details. In some instances, well-known structures and devices are shown in block diagram form in order to avoid unnecessary obscuring.

As described above, when a search engine performs a search (based on a search query) the search engine processes the search query to generate initial document scores for all documents available to the search engine and covered by the search. The initial document scores allow for an initial document ranking—with, for example, documents having a higher score being (based on the search engine's processing) more relevant to the search query than documents having a lower score.

This disclosure relates to systems and methods for adjusting document scores in search results: i.e. adjusting initial document scores as returned by a search engine to change the rank order of the documents. In particular, this disclosure relates to query invariant document score adjustment that learns from user preferences as evidenced in user interactions relating to documents.

Boosting, in the art, typically refers to elevating certain documents in a search result. In this disclosure, reference is made to a score adjustment which reflects that a document's score may be adjusted either to boost the document (so its position in the initial rank order generated by the search engine rises) or downgrade the document (so its position in the initial rank order falls).

At a high level, an overall search process as described herein includes the following steps—
1. Perform search, by a search engine, in accordance with a search query.
2. Determine, by the search engine, a base score based on the initial search.
3. Determine and apply a score adjustment (e.g. document boost) for one or more documents.
4. Determine an updated search score based on the base score and score adjustment.

Expanding out step 3 in more detail, this disclosure provides a process for determining a document score adjustment that involves:
a. Tracking user interaction data of documents in a document database.
b. Determining a document user interaction model based on the user interaction data.
c. Calculating a set of pairwise comparisons of documents based on the document user interaction model.
d. Using the set of pairwise comparisons as a feedback mechanism, train a neural network to learn how to adjust scores.
e. Therefore a given document can be input into the neural network (or a copy) and a corresponding output of the neural network is a score adjustment for that document.

A score adjustment can be simply a value. This is often referred to in the art as an additive boost but the techniques described herein can be used to generate either an additive or subtractive score adjustment (e.g. a score adjustment can be either positive or negative or zero). A score adjustment could also be a multiplier or more complex function which takes the base score as an input and then produces an adjusted score.

Notably, the processing described herein provides for a document score adjustment that is determined independently of an initial document score produced by an initial search and independently of the search query that generated the initial document score. Therefore, a score adjustment can be calculated and associated with the document. When a search process performs step (3), the score adjustment, typically a multiplicative boost, can be quickly applied, allowing for a final ranking of documents to be calculated computationally efficiently within the search engine.

DOCUMENTS

For the purposes of this description a document is an electronic or computer file of any type. Documents may also include fonts, colours, and images that are used when displaying the document on an electronic device, printed to paper or otherwise viewed. Example documents include templates, text files, and images.

The terms "document" and "images" are used in similar contexts in this disclosure. Though document is a more general term than images, many of the example documents provided in this disclosure are images. It is to be noted that similar techniques of the present disclosure can be applied to other document types, such as templates.

Document Metadata

Document metadata is information about a document that is generally part of, or attached to, the document itself. Document metadata may not be readily available on the face of the document.

Documents may also contain other elements such as graphic images, photographs, tables and charts, each of which can have its own metadata. By way of example, document metadata may include details such as file size, date of document creation, the names of the author and user who most recently modified the document, the dates of any changes, the total edit time, etc. Specific document types may have additional document metadata. For example, an image that is a photograph may have details of the camera that took the photograph (such as make, model), the date/time the photograph was taken, and any camera settings stored as document metadata for the image.

Searching and Initial Document Scores

As described above, initial processing in response to a search query is performed by a search engine. Various search engines exist and can be used with the present disclosure—e.g. Apache Solr.

A search engine typically performs three general steps to search documents. First, the search engine converts documents into a machine-readable format, often referred to in the art as indexing. A second step is parsing a search query received from a user to understand, in a machine-readable way, the terms of the query. The search terms can be images or keywords, for example. A third step is mapping whereby the search engine maps the user query to the documents stored in the document database to find a result. The search engine may implement one or more specified rules for mapping that determine if a given document is sufficiently relevant or appropriate for the query. The mapping process determines document scores that reflect how well the user query maps to the documents.

Therefore, initial search processing generates a set of initial document scores. Each document score indicates the search engine's determination as to the relevance (or otherwise) of the document the score is associated with to the search query. In some embodiments, an initial ranking based on the scores can be performed.

Final Document Scores/Rankings

The present disclosure is concerned with additional processing that is performed after a search engine generates the set of base scores (that is, as above the initial document scores for documents). This additional processing involves applying a post-search score adjustment (e.g. a boost) to each document score and then generating a final ranking based on the adjusted document scores. This allows for the initial ranking generated by the search engine to be changed, for example by boosting certain documents above others.

Document Score Adjustments

As described above, a document score adjustment is an operation performed on an initial search engine score to modify or adjust a position of a document in a final result from a search query. Documents may be elevated (or downgraded) in a search to address specific search concerns, popularity or other manual intervention. For example, a document score adjustment can be used to boost high quality content so that it is more accessible to users or downgrade low quality content so it is less accessible to users.

Document score adjustments include additive and multiplicative score adjustments. For example, a multiplicative score adjustment (boost) of a document d, where $0<=boost_d<=1$, may have a formula of:

$$Score_d = base\ score_d * (1 + boost_d)$$

In this example, the multiplicative score adjustment preserves reflexivity, equivalence, anti-symmetry and transitivity. In contrast an additive score adjustment of a document d, where $0<=boost_d<=1$, may have a formula of:

$$Score_d = base\ score_d + boost_d$$

Example System

FIG. 1 illustrates an example system 100 in which the features and techniques described herein are implemented. In this example system 100, there are three user computers 104A, 104B, 104C that maintain a client module 108 for interacting with the search system 102. Each of these computers is connected to a network 106. The network 106 could be a suitable network of any kind such as the internet. Also connected directly to the network 106 is a search system 102, and specifically a search engine 140. A search engine 140 is an application that sorts, or ranks, a collection of documents in response to a search query, typically specified by a user in the form of keywords or natural language.

The collection of documents in this example are documents maintained in a document database 112. The document database 112, therefore, stores local documents that can be searched. This database 112 can include many types of documents such as templates, images and graphics (including raster and vector). In some embodiments, a search can also cover external documents (accessible, for example, via network 106), however for ease of description the present embodiments are described as searching local documents in the document database 112 only.

On receiving and processing a search query, the search engine 140 initially generates a base score for each of the documents covered by the search (e.g. all documents in database 112, unless documents are filtered out by the search query).

The search system 102 includes a user interaction database 114. The user interaction database 114 is a collection of user interaction data that has been collected and stored by the search system 102. By way of example, user interaction data may include click (or document selection) data reflecting which documents have been clicked on (selected) by a user when presented in search results. In some embodiments, click data includes a position of the document in a search result at the time it was clicked/selected. Click data can also include a context for the user interaction, that is, which other documents a user had the choice of clicking on.

The search system 102 also include pairwise comparisons database 116 which stores pairwise comparison data. The pairwise comparisons data is generated by the search system 102 based on the user interaction data and an attractiveness model (described further below) that is generated for each of the documents. The pairwise comparisons measure a pair of documents to indicate which one of the two documents is more likely to be clicked, or otherwise interacted with by the user, than the other.

In some embodiments, additional parameters can be used to determine if a document was examined (rather than simply clicked), or whether the user was satisfied with the document they clicked. For the purposes of the examples provided below, an attractiveness score is a metric of a perceived relevance of a document based on document user interaction in the form of user clicks in a search result.

The score adjustment system 110 includes a number of modules. These modules include a document module 122, a user interaction model 124, a score adjustment module 128 and a search module 130. The score adjustment module 128 comprises two submodules: a pairwise comparisons module 132, which is used to build the pairwise comparisons dataset 116, and an adjustment model module 134 which is used to train the adjustment model 118 and generate an adjustment output.

The document module 122 maintains the code and logic for handling the documents in the document database 112. The search module 130 maintains the code and logic for handling the search engine 130 and retrieving data in the search database 142.

The user interaction module 124 maintains the code and logic for handling the user interaction data stored in the user interaction database 114. In this example system, user interaction data in the user interaction database 114 are associated with a document in the document database so that the user interactions on a document can be determined. In some cases, however, the user interactions will be associated with a query or other information that can be used to give context to the user interactions.

The score adjustment module 128 and search module 130 are described further below.

Computer System

The present invention is necessarily implemented using an electronic device. The electronic device is, or will include, a computer processing system.

Figure 2:
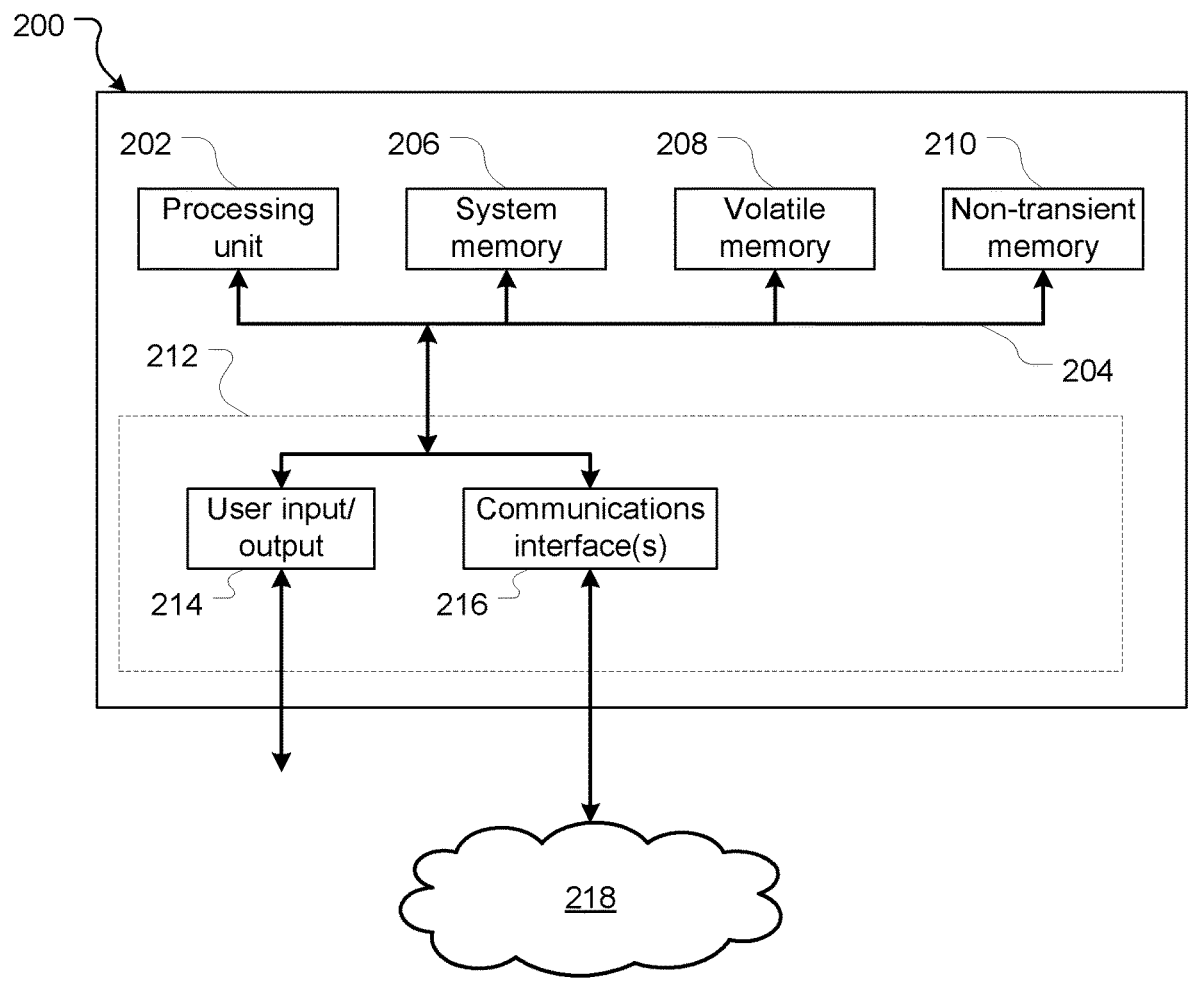
FIG. 2 provides a block diagram of a general-purpose computer processing system configurable to perform various features of the present disclosure.

FIG. 2 provides a block diagram of one example of a computer processing system 200 which may be for example search system 102, the document score adjustment system 110, or the user computers 104A, 104B, 104C.

System 200 as illustrated in FIG. 2 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

The computer processing system 200 includes at least one processing unit 202. The processing unit 202 may be a single computer-processing device (e.g. a central processing unit, graphics processing unit, or other computational device), or may include a plurality of computer processing devices. In some instances all processing will be performed by processing unit 202, however in other instances processing may also, or alternatively, be performed by remote processing devices accessible and useable (either in a shared or dedicated manner) by the system 200.

Through a communications bus 204 the processing unit 202 is in data communication with a one or more machine-readable storage (memory) devices that store instructions and/or data for controlling operation of the processing system 100. In this instance system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 112, via which system 100 interfaces with various devices and/or networks. Generally speaking, other devices may be physically integrated with system 200, or may be physically separate. Where a device is physically separate from system 200, connection between the device and system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 100 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 200 connects—whether by wired or wireless means—allow data to be input into/received by system 200 for processing by the processing unit 202, and data to be output by system 100. Example devices are described below, however it will be appreciated that not all computer-processing systems will include all mentioned devices, and that additional and alternative devices to those mentioned may well be used.

For example, system 200 may include or connect to one or more input devices by which information/data is input into (received by) system 200. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 200 may also include or connect to one or more output devices controlled by system 100 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 200 may also include or connect to devices which may act as both input and output devices, for example memory devices (hard drives, solid state drives, disk drives, compact flash cards, SD cards and the like) which system 100 can read data from and/or write data to, and touch-screen displays which can both display (output) data and receive touch signals (input).

System 200 may also connect to communications networks (e.g. the Internet, a local area network, a wide area network, a personal hotspot etc.) to communicate data to and receive data from networked devices, which may themselves be other computer processing systems.

It will be appreciated that system 200 may be any suitable computer processing system such as, by way of non-limiting example, a desktop computer, a laptop computer, a netbook computer, tablet computer, a smart phone, a Personal Digital Assistant (PDA), a cellular telephone, a web appliance. Typically, system 200 will include at least user input and output devices 214 and (if the system is to be networked) a communications interface 216 for communication with a network 218. The number and specific types of devices which system 200 includes or connects to will depend on the particular type of system 200. For example, if system 200 is a desktop computer it will typically connect to physically separate devices such as (at least) a keyboard, a pointing device (e.g. mouse), a display device (e.g. a LCD display). Alternatively, if system 200 is a laptop computer it will typically include (in a physically integrated manner) a keyboard, pointing device, a display device, and an audio output device. Further alternatively, if system 200 is a tablet device or smartphone, it will typically include (in a physically integrated manner) a touchscreen display (providing both input means and display output means), an audio output device, and one or more physical buttons.

System 200 stores or has access to instructions and data which, when processed by the processing unit 202, configure system 200 to receive, process, and output data. Such instructions and data will typically include an operating system such as Microsoft Windows®, Apple OSX, Apple 105, Android, Unix, or Linux.

System 200 also stores or has access to instructions and data (i.e. software) which, when processed by the processing unit 202, configure system 200 to perform various computer-implemented processes/methods in accordance with embodiments of the invention (as described below). It will be appreciated that in some cases part or all of a given computer-implemented method will be performed by system 200 itself, while in other cases processing may be performed by other devices in data communication with system 200.

Instructions and data are stored on a non-transient machine-readable medium accessible to system 200. For example, instructions and data may be stored on non-transient memory 210. Instructions may be transmitted to/received by system 200 via a data signal in a transmission channel enabled (for example) by a wired or wireless network connection.

Example Method

Figure 3:
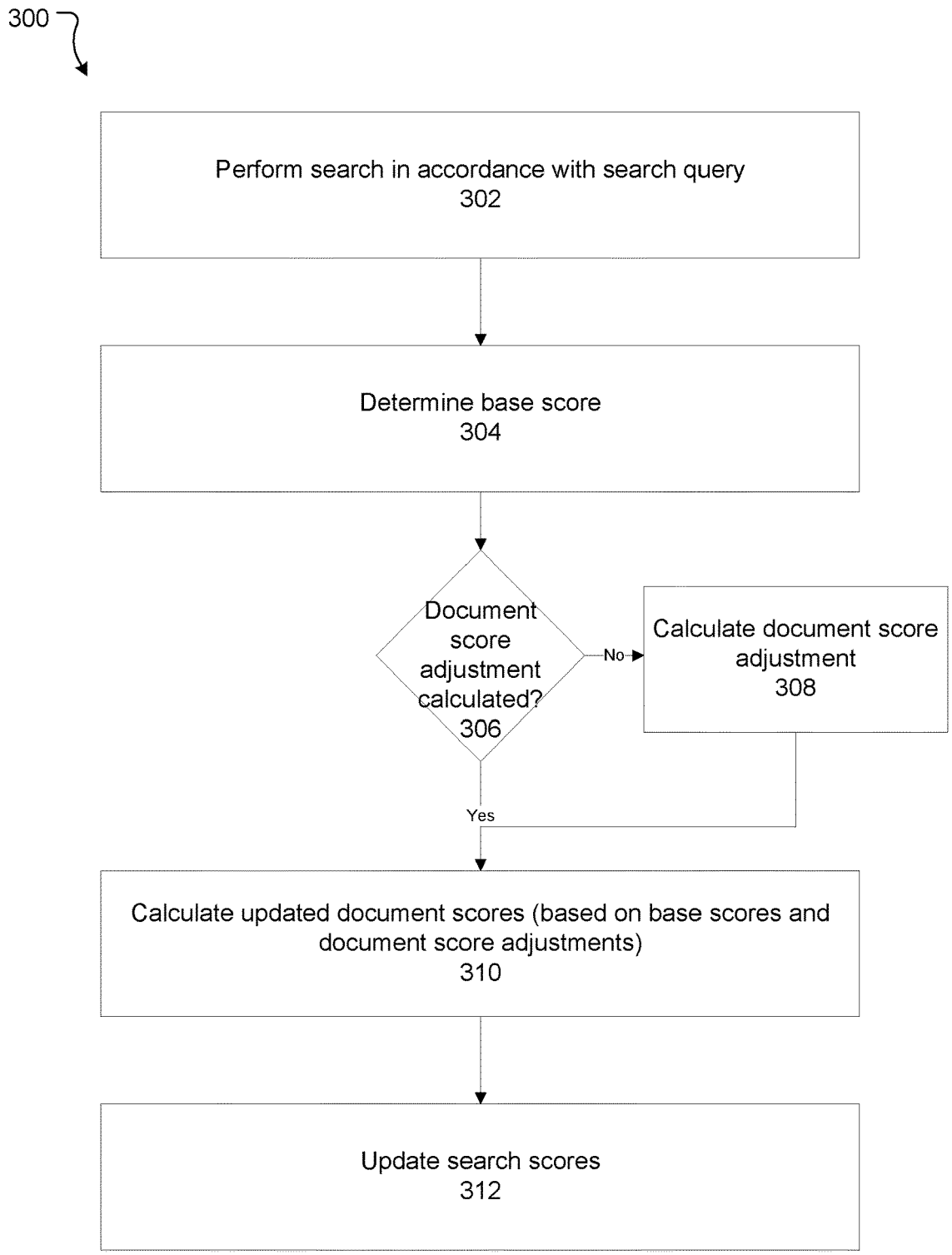
FIG. 3 is a flowchart of a method for determining a search score.

This section describes a computer implemented method for searching documents and producing a search result. The process 300 will be described with reference to FIG. 3.

The method 300 starts when a user provides a search query to the search system 102, and specifically the search engine 140. A search query can be a simple character to a string of characters. The search query may include one or more keywords, which may be separated by operators such as 'not', 'and', 'or' etc. The search engine 140 then performs 302 a search based on the search query. Typically, the search engine 140 will determine a relevance score for each document based on a metric of how relevant the document is to the query.

The search engine 140 then uses the initial results from this search to determine 304 a base score for each document in the search result. A base index for a document may simply be the relevance score for that document as determined by the search engine at step 302. However, in some embodiments it is possible for the search engine 140 to process the relevance score. In other embodiments, other forms of preprocessing may be performed. The results of the search (including a search score and associated rank for the document in the search) can be stored in the search database 142.

At 306, the search system 102 then determines if a document score adjustment has been calculated. Step 306 can be performed on a document by document basis. Alternatively, it may be possible to perform the step 306 in respect of a single document and, if a document score has not been calculated for that single document, infer that document scores will not have been calculated for any documents. It should be noted that this does not materially affect how the present disclosure operates.

If document score adjustments have not been calculated, the search system 102 proceeds to calculate 308 document score adjustments before proceeding to 310. The manner in which document score adjustments are calculated is described below.

If the document score adjustments have been calculated, the search system 102 calculates updated document scores 310. To do so, for each document in the search result the search system 102 identifies the score adjustment for that document and applies it to the base score for that document. For example, if score adjustments are multiplicative, applying the score adjustment involves multiplying the base score by the score adjustment.

At 312, the search engine updates the search scores using the updated scores calculated at 310. At this point the search results can be reranked according to the updated search score. The rankings of the documents can be finalised at this point and the search engine 140 can provide the results back to the user.

Calculating Document Score Adjustments

This section and the following sections describe a computer implemented for calculating a document score adjustment including process 400, 500, and 600/800 (processes 600 and 800 relating to alternative embodiments).

Figure 4:
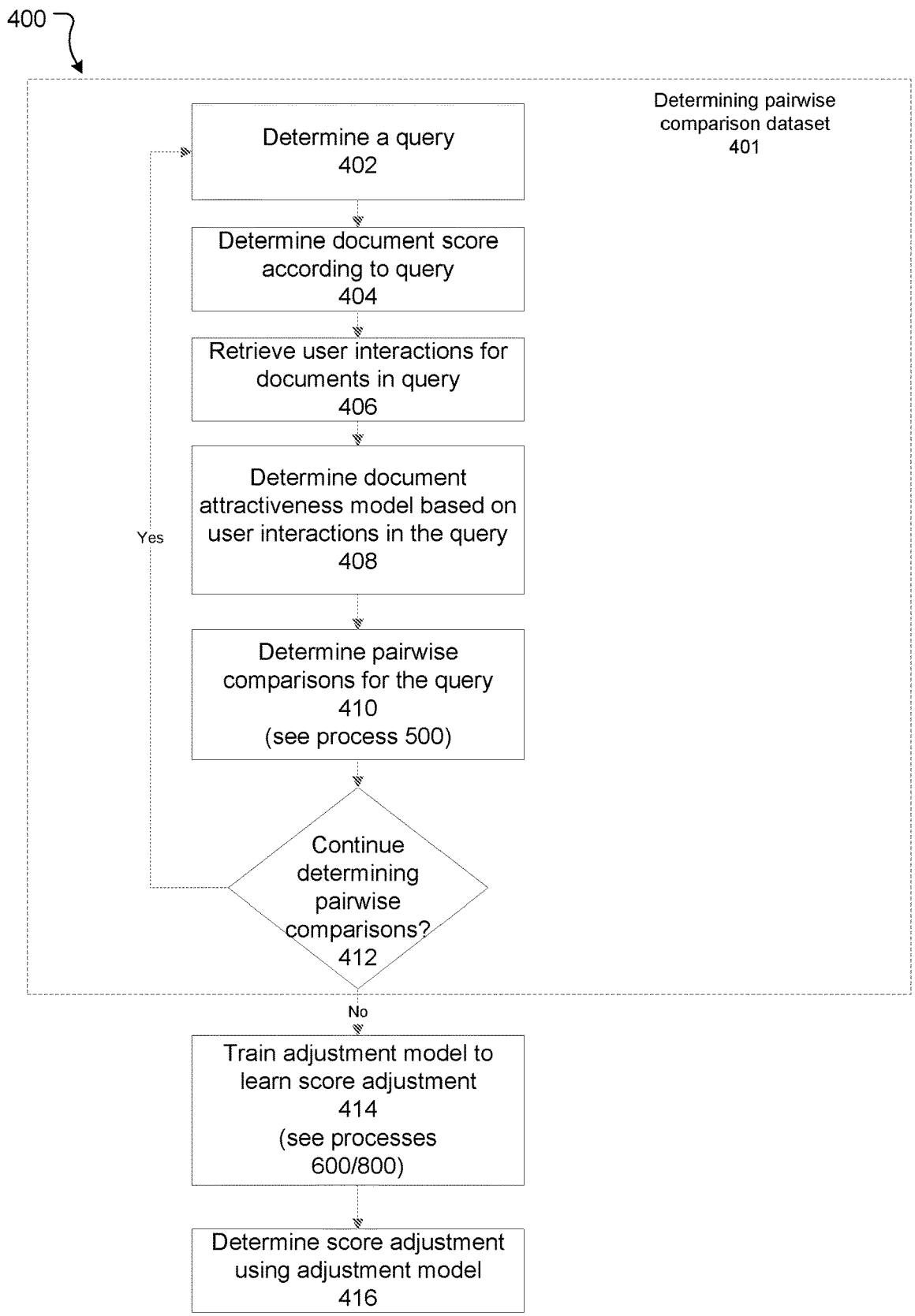
FIG. 4 is a flowchart of a method for generating document score adjustments.

Process 400 involves determining a document score adjustment. The process 400 will be described with reference to FIG. 4.

In the present embodiments, assessing whether one document is more attractive than the other is performed by hypothesis testing. Hypothesis testing which is tested over a significant volume (the precise amount would likely depend on the number of documents in the document database and volume of user interactions) leads to an assessment of attractiveness of a document with some level of confidence. The pairwise comparisons therefore is a dataset of hypotheses about attractiveness of documents. Determining 401 the pairwise comparisons therefore is the starting point of the process 400. This dataset is used later to train 414 a neural network (the adjustment model 118) to learn how to determine a score adjustment. Once trained, the neural network is used to determine 416 a score adjustment.

Initially the score adjustment module 128 determines 402 a search query. An example of determining a query could be retrieving stored results of an historical search query, such as "blue bird singing". Determining a query may also therefore involve determining 404 a stored score of each of the documents in the document database as the document scores for a query (as produced by the search engine 140 and stored, for example, in the search database) may also be stored. In some cases, not all documents will have document scores or some documents may be ignored. For example, some documents with a score of zero or below a specific threshold of relevance may be discarded, at least for the purposes of determining a score adjustment.

From this score, the documents can be ranked in order so as to provide a position for each of the documents. The score adjustment module 108 may also rank the documents based on the score provided above.

The score adjustment module 108 then retrieves 406 the user interaction data from the user interaction database 114 for each of the documents that were score$_d$ previously at 404. In the present example, user interaction data includes how many times a document was clicked in a given search result. Other user interaction data may also be tracked such as time spent on a mouse hover over or clicking on an expand option (if there is such an option).

The score adjustment module 108 then determines 408 a document attractiveness model based on the user interaction data. As is described elsewhere in this disclosure, attractiveness is a perceived relevance of a document in respect of other documents. This disclosure provides for modelling attractiveness of a document as set out below.

User interaction can be noisy and not necessarily determinative of relevance of a document. There are many user studies known in the art that indicate that there are biases that may affect how a user may click on, or otherwise interact with, a document. There is, for example, attention bias to visually salient documents. Novelty bias occurs where the search engine produces previously unseen documents. There are many other types of bias. These biases may be taken into account by introducing random variables and using them to perform an estimation of attractiveness of a document.

An example model is to take into account the number of clicks on the document. In this example model, the random variable $A_i \in \{0, 1\}$ models whether a user finds a document i attractive. The associated probability of attractiveness $\theta_A$ is a random variable distributed according to a Beta distribution. This is the attractiveness model used in the examples in this disclosure.

One example for modelling attractiveness is a Beta-Bernoulli model that takes into account the number of clicks on the document. A random variable can be used to model whether a user finds document i attractive or not. The associated probability of attractiveness in the model is a random variable distributed according to the Beta distribution (which has support between 0 and 1). That is, a probability of attractiveness of document i can be modelled as a Beta-distributed random variable.

Once an attractiveness model is determined, the score adjustment module 128 determines 410 pairwise comparisons for the query determined at 402. In this example, a pairwise comparison is determining for a pair of documents which one is perceived to be most relevant (that is, "attractive"). This is calculated by a comparing a pair of documents based on the document attractiveness model for each of the documents.

The following describes how a comparison of attractiveness of two documents can be calculated using an approach of statistical hypothesis testing with an example hypothesis test.

Assume that an average attractiveness of a first document $A_1$ is greater than an average attractiveness of a second document $A_2$. As the attractiveness of $A_1$ (and $A_2$) is a random variable, there is a probability that the attractiveness of $A_1$ is less than $A_2$. In order to test a hypothesis H that $A_1$ is more attractive than $A_2$, the probability of a comparison of the attractiveness of $A_1$ and the attractiveness of $A_2$ can be computed. In the example where attractiveness is modelled with the Beta-Bernoulli model the hypothesis H can be calculated by the following equation:

$$Pr(\theta_{A_1} \le \theta_{A_2}) =$$
$$\frac{1}{B(\alpha_1, \beta_1)B(\alpha_2, \beta_2)} \int_{-1}^{0} \int_{0}^{1} w^{\alpha_1-1}(w-z)^{\alpha_2-1}(1-w)^{\beta_1-1}(1-w+z)^{\beta_2-1} dw\, dz$$

Where the probability of attractiveness $\theta$ is a random variable distributed according to the Beta distribution, w is $\theta_{A_1}$ and z is $\theta_{A_2} - \theta_{A_1}$. Further in this equation, $B(\alpha, \beta)$ is the beta function. However, this equation can be computationally expensive. As a result, this disclosure provides alternative approximations. One example alternative approximation is to approximate a Beta random variable with a Gaussian random variable.

Given a large enough $\alpha$ and $\beta$ (the parameters of the Beta function above) then a random variable $X \sim B(\alpha, \beta)$ converges according to the following equation, where $$\mu = \frac{\alpha}{\alpha+\beta},$$

that is, the mean of X:

$$\sqrt{\alpha+\beta}(X-\mu) \to N(0, \mu(1-\mu))$$

The random variable X can be expressed as $$X = \frac{G_1}{G_1 + G_2}$$

In this equation, $G_1 \sim \text{Gamma}(\alpha, 2)$ and $G_2 \sim \text{Gamma}(\beta, 2)$. As $\alpha$ and $\beta$ tend to $\infty$, the gamma distributions converge according to the following formula:

$$\frac{G_1 - 2\alpha}{\sqrt{4\alpha}} \to \mathcal{N}(0, 1)$$

$$\frac{G_2 - 2\beta}{\sqrt{4\beta}} \to \mathcal{N}(0, 1)$$

Therefore the convergence equation becomes:

$$\sqrt{\alpha+\beta}\left(\frac{G_1 - 2\alpha}{\sqrt{4\alpha(\alpha+\beta)}}, \frac{G_2 - 2\beta}{\sqrt{4\beta(\alpha+\beta)}}\right) \to \mathcal{N}(0, I_2).$$

If $n = \alpha + \beta$ then this equation can be rewritten as $$\sqrt{n}\left(\frac{G_1}{n\sqrt{4\mu}} - \sqrt{\mu}, \frac{G_2}{n\sqrt{4(1-\mu)}} - \sqrt{1-\mu}\right)$$

Given a function defined as $$g(x, y) := \frac{x\sqrt{\mu}}{x\sqrt{\mu} + y\sqrt{1-\mu}}$$

A first derivative with respect to x and y is $$g'(x, y) = \left(\frac{y\sqrt{\mu(1-\mu)}}{(x\sqrt{\mu} + y\sqrt{1-\mu})^2}, -\frac{x\sqrt{\mu(1-\mu)}}{(x\sqrt{\mu} + y\sqrt{1-\mu})^2}\right)$$

This can be reduced by the delta method to the following:

$$\sqrt{n}\left(g\left(\frac{G_1}{n\sqrt{4\mu}}, \frac{G_2}{n\sqrt{4(1-\mu)}}\right) - g(\sqrt{\mu}, \sqrt{1-\mu})\right) \to$$
$$g(\sqrt{\mu}, \sqrt{1-\mu})^T \mathcal{N}(0, I_2)$$

As $\alpha$ and $\beta$ tend to $\infty$, this equation simplifies to $$\sqrt{n}(X-\mu) \to \mathcal{N}(0, \mu(1-\mu))$$

Given this, it is possible to determine a Gaussian approximation of Y where $$Y = \theta_{A_1} - \theta_{A_2}.$$

Then the Gaussian approximation of Y, which can be denoted $\tilde{Y}$, is, by the properties of Gaussian random variables is $$\mathcal{N}(\mu_1 - \mu_2, \sigma_1^2 + \sigma_2^2)$$

The cumulative distribution function (cdf) for a standard Gaussian distribution is $$\Phi(x) = \frac{1}{\sqrt{2\pi}} \int_{-\infty}^{x} \exp\left(-\frac{t^2}{2}\right) dt$$

The approximation becomes $$Pr(Y \le 0) \approx Pr(\tilde{Y} \le 0) = \Phi\left(\frac{y - (\mu_1 - \mu_2)}{(\sigma_1^2 + \sigma_2^2)}\right)$$

Where $$\sigma_i = \sqrt{\mu_i(1-\mu_i)/(\alpha_i + \beta_i)}, i = 1, 2.$$

The Y approximation above is used in this disclosure as an example attractiveness model to approximate the probability of a document being more attractive than another document.

Each pairwise comparison is scored for significance, which generally indicates whether the measured difference in attractiveness is above a margin of error. A pairwise comparison is stored in the pairwise comparisons dataset 116 if the significance of the pairwise comparison is above a specified threshold. This process is illustrated in more detail in FIG. 5.

At step 412, the score adjustment module 128 determines 412 whether to continue pairwise comparisons based on a different query. The score adjustment module 128 may determine for example that there are a statistically significant sample of query and document pair combinations that have been analysed. The score adjustment module may set additional criteria for finishing the pairwise comparisons.

If the score adjustment module 128 determines the process to continue, the score adjustment module 128 can return to 402 to determine a new query and repeat the processing above for a new query. This will build a set of pairwise comparisons for multiple queries. The steps of calculating pairwise comparisons are repeated until there are a sufficient amount of pairwise relevance comparisons stored in the pairwise comparison dataset 116.

Once the pairwise comparison dataset has been determined, the dataset can be used as a feedback mechanism to train a neural network to learn how to perform a score adjustment on a document or documents. Training a neural network in this manner is outlined in more detail in FIG. 6.

Once the neural network is trained, then it is possible to utilise the neural network to determine 416 a score adjustment for a document based on the neural network. That is, a given document can be input (typically input includes features of a document) into the neural network which then generates a score adjustment for that document. The score adjustment can then be used by a search engine such as 140 (or other process) to update document scores per 310 above.

Pairwise Comparison Dataset

Figure 5:
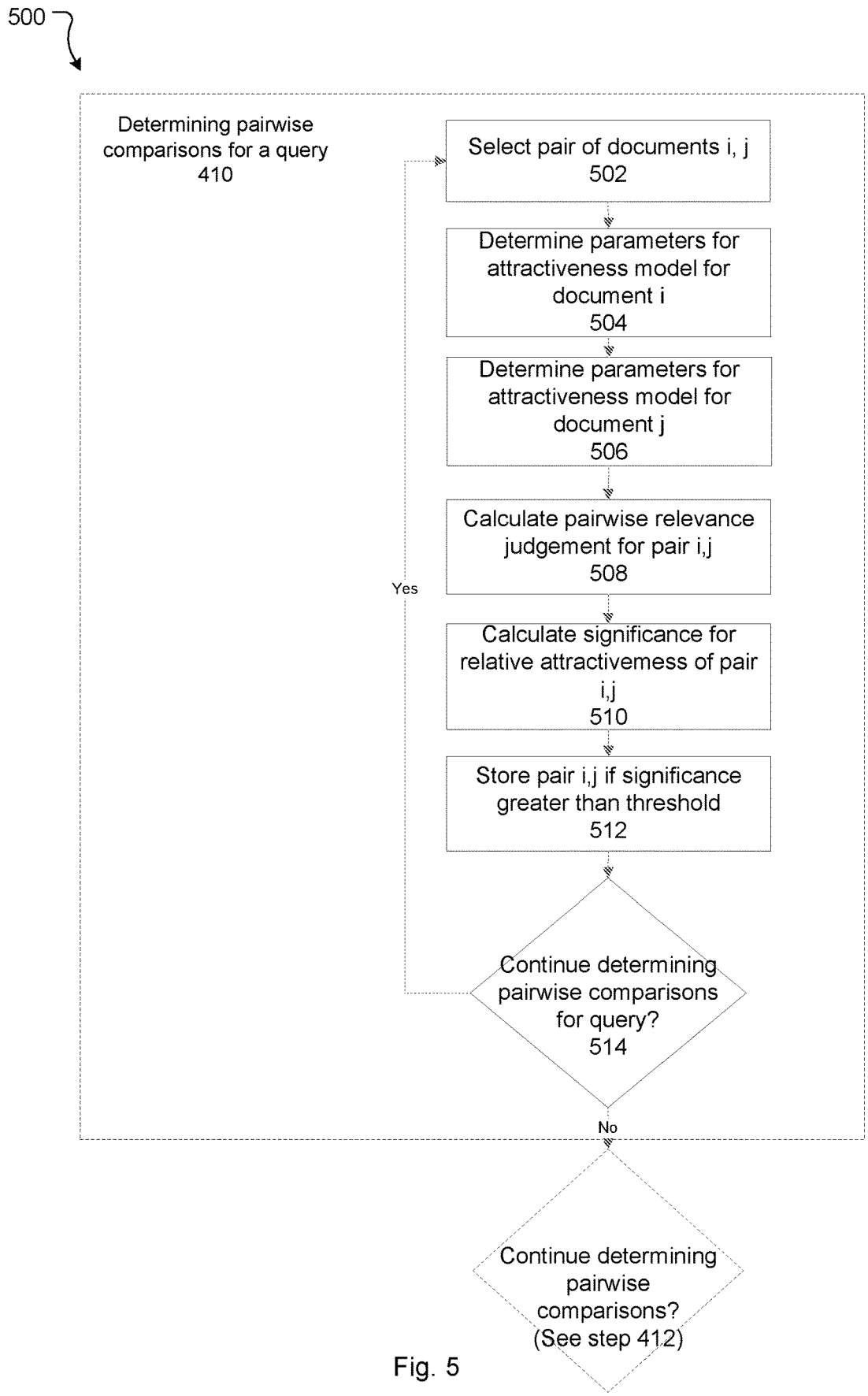
FIG. 5 is a flowchart of a method for determining pairwise comparisons.

As described above, it is possible to generate a dataset of pairwise comparisons from a model of attractiveness of one or more documents in the results of a query. Pairwise comparisons involve determining for a pair of documents which one is perceived to be most relevant. This is illustrated in FIG. 5.

In the present disclosure, pairwise comparisons are generated by the pairwise comparisons module 132.

Initially, pairwise comparisons module 132 selects 502 two documents from the document database. These documents can be selected at random, or selected in such a way as to ensure that the compared documents are a representative subset of all the documents in the document database. A representative subset may be a statistically significant sample of free images for example. For the purposes of the following example, a first document is referred to as i, a second document is referred to as j.

For the first document i, the pairwise comparisons module 132 determines 504 parameters of the attractiveness model described using the click information. In the example attractiveness model described above, based on a Gaussian approximation of a random variable X, one equation that can be used to determine the result is $$\phi\left(\frac{y - (\mu_1 + \mu_2)}{\sigma_1^2 + \sigma_2^2}\right)$$

where μ is the mean of X and σ is the variance of X.

For the second document j, the pairwise comparisons module 132 determines 506 parameters of the attractiveness model described using the click information. Again the same equation that can be used to determine the result:

$$\phi\left(\frac{y - (\mu_1 + \mu_2)}{\sigma_1^2 + \sigma_2^2}\right)$$

where μ is the mean of X and σ is the variance of X.

For the pair of documents (i,j), the pairwise comparisons module 132 determines 508 the relative attractive score of the pair, that is, probability based on the attractiveness model that one document is more attractive than the other document. This may involve the calculation of a probability value (referred to as p-value) that, in an example, represents the probability that a hypothesis, such as document i is more attractive than document j, is wrong or false. That is, the p-value can be considered representative of the probability of error in a hypothesis being true.

The pairwise comparisons module 132 then determines 510 the significance of the relative attractiveness of the pair of documents.

If the p-value or error in a hypothesis of attractiveness is significant (that is, the the p-value is above or below a specified significance level—above or below depending on the significance calculation used) then pairwise comparisons module 132 stores the comparison in the pairwise comparisons database 116. Any appropriate level of significance may be adopted, however by way of example in certain implementations the threshold significance is 0.05. For example, if the p-value is lower than the significance threshold 0.05, a hypothesis that document 1 is more attractive than document 2 would be accepted (that is, stored in the pairwise comparisons database 116). To be very confident that all stored pairwise comparisons are correct, a high threshold significance value, like 0.001 could be used. Each pairwise comparison therefore represents a relative attractiveness documents within a pair of documents.

An example data structure for records stored in the pairwise comparisons dataset is:

```
[
    document id 1,
    document id 2,
    query id,
    p-value
]
```

Neural Network

Calculating pairwise comparisons as described above is potentially a computationally expensive process since pairs of documents need to be compared for each query.

Figure 6:
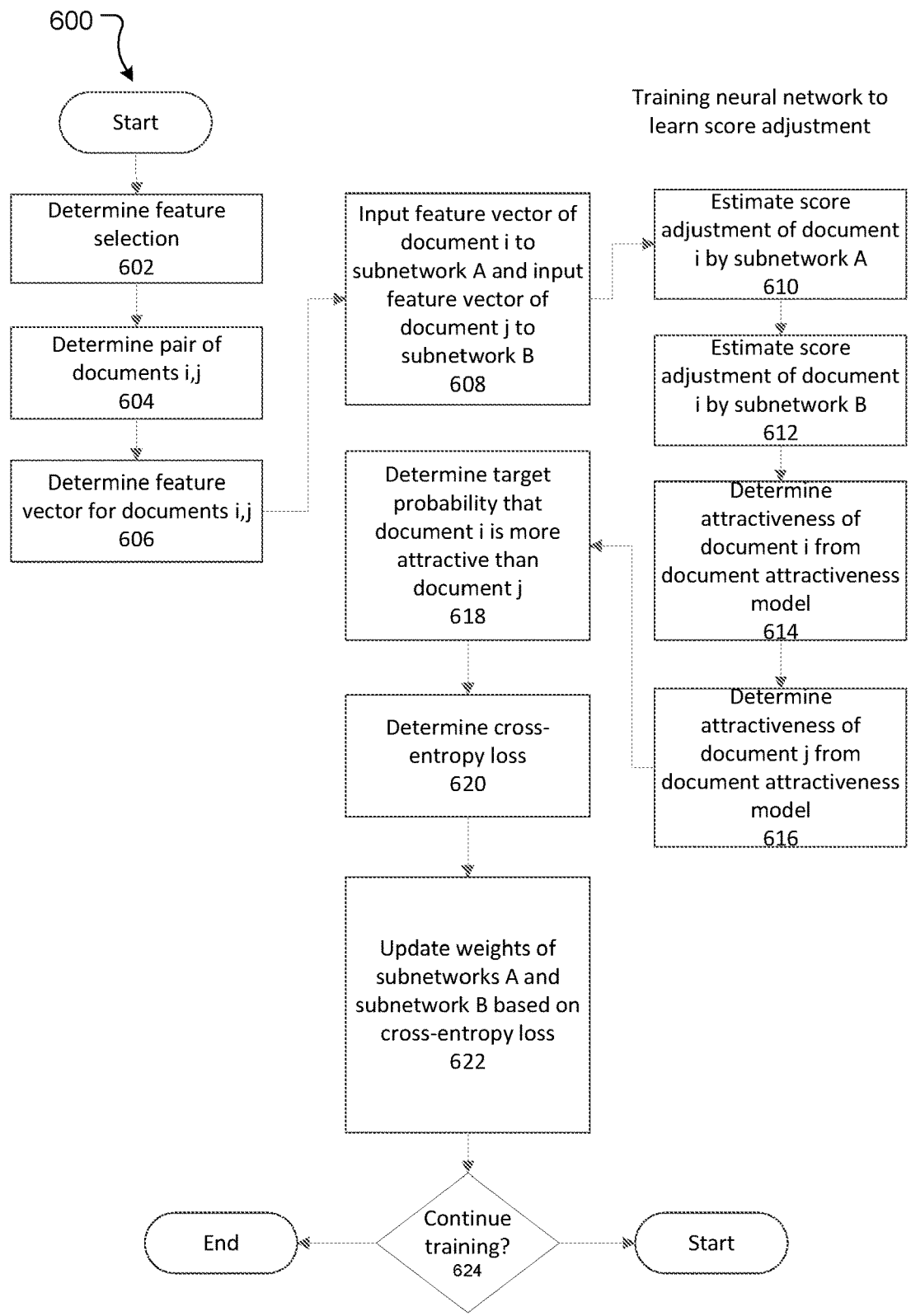
FIG. 6 is a flowchart of a first method for training a neural network to learn document score adjustment.

In certain embodiments, a neural network is used to model how documents are ranked and thereby reduce computation at a query level. The neural network, referred to in this disclosure as an adjustment model 118, is trained on the dataset of pairwise relevance comparisons discussed above. A process 600 for training the neural network to learn how to adjust scores is illustrated in FIG. 6.

Document Features

In this example, inputs to the neural network include document features. Document features are metrics of characteristics of a document. Relevantly, document features include characteristics of the content of the document, such as the average intensity value of each pixel in an image, as well as characteristics of the metadata of the document such as the author or photographer. Notably, document features can be query-invariant, that is, the feature value (or score) in respect of a document is independent of other documents and does not depend on a search query.

In some embodiments all features of features can be used as inputs to the neural network. In other embodiments, a subset of features of documents can be specified. By way of example, for image-type documents, specified features contemplated include: whether an image is a cutout; whether an object in an image is a single, isolated object; whether the image supports being placed in a photoholder; whether an image can be recoloured; whether an image should be rescaled or repeated if enlarged; whether an image is free or paid; whether the image is a raster or vector; and a score indicative of the quality of the image (for example a value from 1 to 4). Other examples may be contributor brand or artist. Document features are typically numeric or symbolic for ease of processing. For some features, types such as string can be converted to numerical categorical values.

Features can be centered and whitened to aid with convergence during training. Data pre-processing can be performed to determine if values of the features are missing. In some embodiments, missing feature values can be imputed using, for example, an average value.

In other embodiments, a deep learning neural network may be used. In those embodiments, it is not necessary to select features as the relevant features will be determined by deep learning neural network itself. The deep learning neural network in addition automatically calibrates the relevant features. These embodiments will be described in more detail below.

Adjustment Model 118

In the following example, the adjustment model 118 is a neural network that takes in one or more inputs. The inputs for a given document are features of that document (as described above) and may be described/input to the model in, for example, a feature vector. In some embodiments, the adjustment model 118 is a Siamese neural network. A Siamese neural network uses the same weights while taking in two different input vectors to compute an output vector. In this case, there are two documents involved in a comparison so features of both documents are used as inputs to the Siamese neural network.

Typically, the inputs to the adjustment model 118 are features of the document. Therefore for each pair of documents $d_i$ and $d_j$, the features of $d_i$ will be one input and the features of $d_j$ will be another input. The weights in the neural network can be adjusted through optimization procedures. Optimization procedures contemplated in this disclosure include stochastic gradient descent.

The neural network of the adjustment model 118 can be trained by adjusting the weights to minimize a loss function. The loss function can be, for example, a cross entropy loss function. An example cross entropy loss function can be defined as:

$$L_{i,j}(b_i, b_j) = -\tilde{p}_{i,j}\log p_{i,j} - (1 - \tilde{p}_{i,j})\log(1 - p_{i,j})$$

Where $$p_{i,j} = \frac{1}{1 + \exp(-\gamma(b_i s_i - b_j s_j))}$$

This can be simplified to $\gamma(1-p_{i,j})(b_i s_i - b_j s_j) + \log(1 + \exp(-\gamma(b_i s_i - b_j s_j)))$ In this example loss function, $\gamma$ is a steepness parameter, $p_{i,j}$ is the target probability of document pair i and j and $b_i$ and $b_j$ are the score adjustment values for the corresponding documents i and j (the score adjustment values being based on the query invariant features for the documents). In this example, $s_i$ and $s_j$ are the base scores from the search engine for documents i and j.

If a Siamese neural network is used, then it is possible to train the network with pairs such that $p_{i,j}=1$ if document i is more relevant than document j and zero otherwise, effectively generating a binary label/classification for the stored pairwise comparisons dataset in pairwise comparisons database 116. Because a Siamese neural network is symmetrical, cases where $p_{i,j}=1$ need only be considered. This can simplify the loss function. The adjustment model 118 then seeks to minimise the average loss over all the document pairs. The average loss over all document pairs in a dataset D can be represented as $$L(\mathcal{D}) = \frac{1}{|\mathcal{D}|} \sum_{i,j \in \mathcal{D}} L_{i,j}(b_i, b_j)$$

Training an Adjustment Model 118 (Embodiment 1)

This section describes a first embodiment of a computer implemented method for training an adjustment model 118. The process 600 will be described with reference to FIG. 6.

The process 600, which is performed by the adjustment model 118 module 134, starts whenever the adjustment model 118 needs to be initialised. In the present example the adjustment model 118 is a Siamese neural network.

In order to train the adjustment model 118, as a first step, the adjustment model module 134 determines 602 document features that will be used to assess attractiveness. As above, document features include metrics of the documents, document type, category, metadata and potentially distinguishing aspects of the document.

The next step 604 is to determine a pair of documents (i, j) that will be compared, for example by selecting two documents at random from the document database 112. In some cases, the adjustment model module 134 may take into account documents that have previously been selected and preference documents that have not been selected for comparison.

At 606, a feature vector is determined for each of the documents (i,j) set of the relevant feature values for that document.

In this example, the neural network of the adjustment model 118 is a Siamese neural network as described above. This means there are two subcomponents to the neural network: subnetwork A and subnetwork B. At 608, a first feature vector, that is the feature vector corresponding to a first document i, is input into subnetwork A. The second feature vector, that is the feature vector corresponding to a second document j, is input into subnetwork B.

The adjustment model module 134 then estimates 610 the boost of document i from the output of subnetwork A based on the feature vector of document i. Similarly, the adjustment model module 134 estimates 612 the boost of document j from the output of subnetwork B based on the feature vector of document j.

The adjustment model module 134 then determines 614 the attractiveness of document i from the document attractiveness model 126 described above. Similarly, the adjustment model module 134 then determines 616 the attractiveness of document j from the document attractiveness model 126 described above. Steps 614 and 616 may simply involve determining the entries for document pair i, j in the pairwise comparisons dataset stored in the pairwise comparisons database 116 where the pairwise comparison dataset has been previously determined.

Based on this, the adjustment model module 134 can determine 620 a target probability that document i is more attractive than document j (as described above).

The adjustment model module 134 then determines 620 the loss based on the loss function, which in this example (and as described above) is a cross-entropy loss, taking into account the target probability determined earlier.

The weights of subnetwork A and B are then updated 622 based on the cross-entropy loss according to a gradient.

The gradient for each document pair i,j is given by $$\frac{\partial L_{i,j}}{\partial b_i} = \gamma s_i \left( (1 - \tilde{p}_{i,j}) - \frac{1}{1 + \exp(-\gamma(b_i s_i - b_j s_j))} \right)$$

And $$\frac{\partial L_{i,j}}{\partial b_j} = -\gamma s_j \left( (1 - \tilde{p}_{i,j}) - \frac{1}{1 + \exp(-\gamma(b_i s_i - b_j s_j))} \right)$$

The learning rule of the Siamese network using a single training pair, with learning parameter n can then be expressed using stochastic gradient descent as $$w_k \leftarrow w_k - \eta \frac{\partial L_{i,j}}{\partial w_k} = w_k - \eta \left( \frac{\partial L_{i,j}}{\partial b_i} \frac{\partial b_i}{\partial w_k} + \frac{\partial L_{i,j}}{\partial b_j} \frac{\partial b_j}{\partial w_k} \right)$$

This can be expressed as $$\frac{\partial L_{i,j}}{\partial w_k} = \gamma \left( (1 - \tilde{p}_{i,j}) - \frac{1}{1 + \exp(-\gamma(b_i s_i - b_j s_j))} \right) \left( s_i \frac{\partial b_i}{\partial w_k} - s_j \frac{\partial b_j}{\partial w_k} \right)$$

or $$= \lambda_{i,j} \left( s_i \frac{\partial b_i}{\partial w_k} - s_j \frac{\partial b_j}{\partial w_k} \right)$$

That is, $$\lambda_{i,j} := \gamma \left( (1 - \tilde{p}_{i,j}) - \frac{1}{1 + \exp(-\gamma(b_i s_i - b_j s_j))} \right)$$

The adjustment model module 134 may train over a single pair of documents, or a group of documents. This is referred to as a minibatch. A minibatch may improve the speed at which the model can be trained. That is, it is possible to use a process of mini-batched stochastic gradient descent to speed up training the adjustment model 118. Document pairs in a minibatch I can be summed up as follows $$\sum_{i,j} \lambda_{i,j} \left( s_i \frac{\partial b_i}{\partial w_k} - s_j \frac{\partial b_j}{\partial w_k} \right) = \sum_i \lambda_i s_i \frac{\partial b_i}{\partial w_k}$$

where $$\lambda_i = \sum_{j:(i,j) \in I} \lambda_{i,j} - \sum_{j:(j,i) \in I} \lambda_{i,j}.$$

At step 624, the adjustment model module 134 will determine whether the training should continue. Typically, training may occur over a small to substantial percentage of the documents in the document database. For example, the adjustment model 134 may determine that there is a statistically significant sample of document pairs that have been analysed. Although training could be performed over all the documents in the document database doing so may not be desirable as it may result in over-fitting, which may in turn cause in spurious results in new documents.

Neural Network

Figure 7:
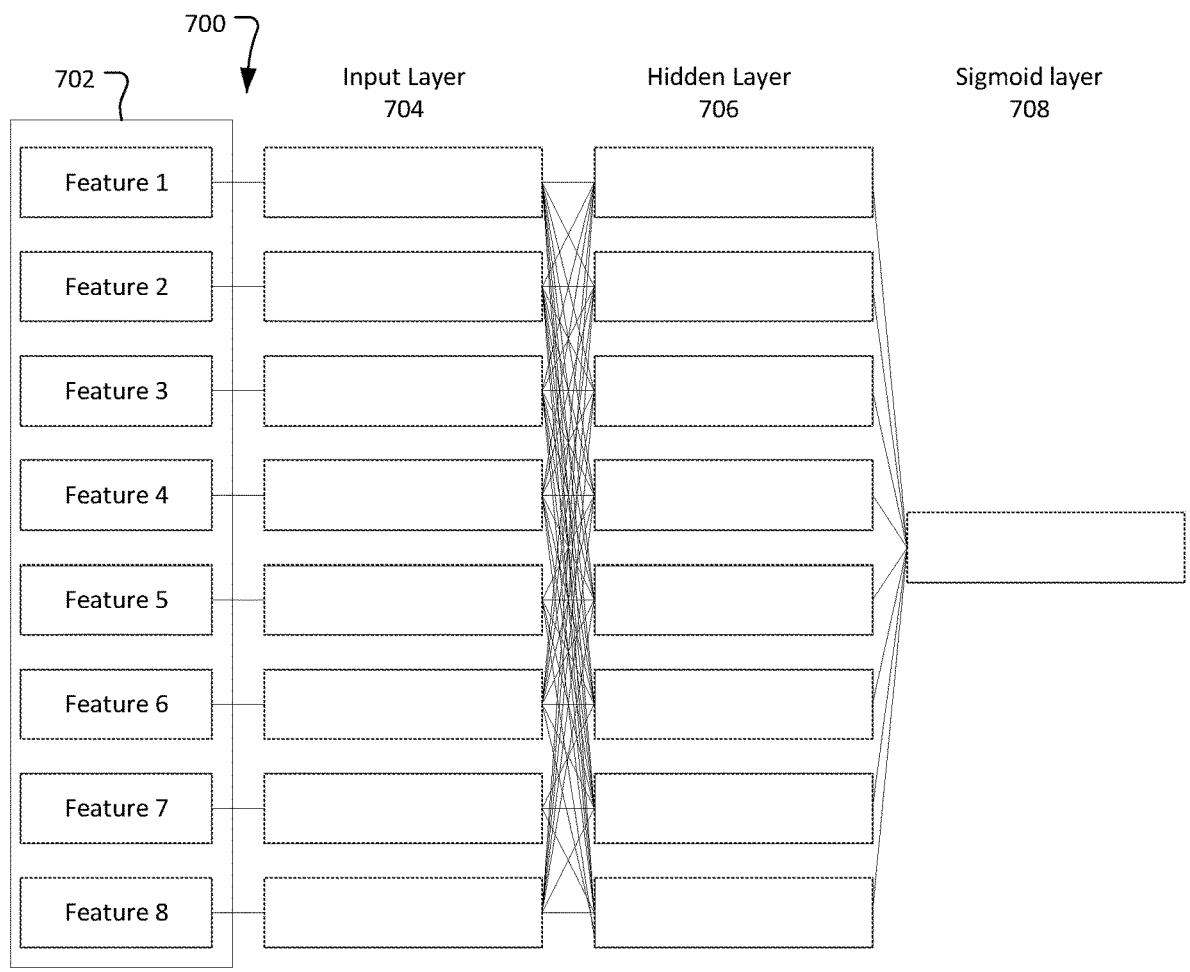
FIG. 7 illustrates an example neural network to learn document score adjustment according to the first method illustrated in FIG. 6.

FIG. 7 illustrates an example adjustment model 700. The adjustment model in this example is based on a neural network that is trained as described in this disclosure such as according to process 600. In this example, a feature vector 702 in input into an input layer 704, which is a layer with the same number of nodes as there are features. There is a second layer of nodes, hidden layer 706, which is fully connected with the input layer. This is followed by a sigmoid layer, which is connected to the hidden layer.

The sigmoid layer produces the document score adjustment of a document i based on the corresponding input feature vector for document i. A sigmoid layer is a layer with a non-linear function (such as $$\frac{1}{1 + e^{-x}})$$

that produces an output between two defined values (in this example, 0 and 1) but also has a smooth gradient. In this case, the output can be scaled and capped to a range of 1 to 1.5 for the purposes of a multiplicative score adjustment. As above, the multiplicative score adjustment is a multiplier that is applied to the initial document score, so this can significantly increase the score of a document with a score adjustment of 1.5, but leave documents with a score adjustment of 1 unchanged.

Notably once the adjustment model 118 has been trained, the score adjustment function such as 700 can be used to score or index all the documents in the document database based on a base score generated by a search engine. Each document therefore is associated with a score adjustment (that is, for example, a multiplier value) from the score adjustment function. This means the documents can be evaluated offline (i.e. without requiring a network connection to a user). A new document can be added to the document database and evaluated to determine the corresponding score adjustment value. In some embodiments, it is possible to select from the variants described above as to how the score adjustment will be determined.

Training an Adjustment Model 118 (Embodiment 2)

Figure 8:
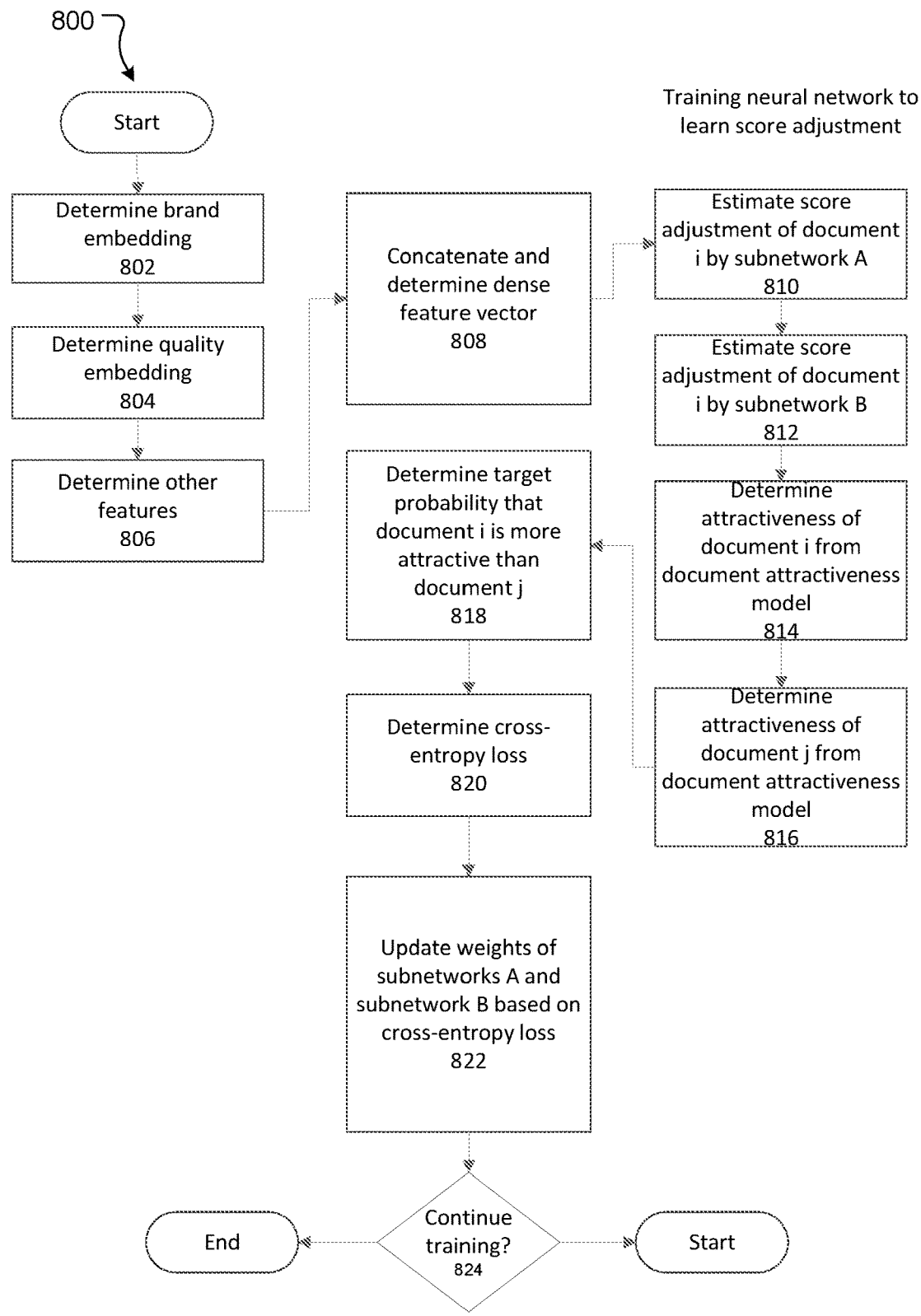
FIG. 8 is a flowchart of a second method for training a neural network to learn document score adjustment.

This section describes a second embodiment of a computer implemented method for training an adjustment model. The process 800 will be described with reference to FIG. 8. In this embodiment, the adjustment model 118 is a deep learning neural network.

The process 800, which is performed by the adjustment model module 134, similarly to process 600 starts whenever the document score adjustment function needs to be initialised. Unlike process 600, all of the features of a document can be concatenated into a single vector which is then input into the deep learning neural network. This is because the adjustment model 118, being a deep learning neural network, will determine which of the features are relevant for the purpose of determining a score adjustment.

In order to train the neural network, as a first step, the adjustment model module 134 determines 802 a brand embedding, where the brand is the contributor brand of a document. As a second step, the adjustment model module 134 determines 804 a quality embedding, where quality is a score of the quality which may be determined by a document reviewer or may be automatically determined based on attributes of the document (such as image size and resolution). For example a score of the quality of an image may range from 1 to 4. The adjustment model module 134 then determines 806 an embedding for other features. Other features include the features mentioned above including The adjustment model module 134 will then concatenate these three embeddings to determine a dense feature vector which is an input to the first layer, an embedding layer, of the adjustment model 118. For illustration, the following example describes an embedding layer used for text processing. Assuming an input contains two sentences:

Hope to see you soon

Nice meeting you

These can be encoded as dense vectors [1, 2, 3, 4, 5] and [6, 7, 4, 0, 0], where each word is assigned a unique integer. In this example, each input has a size limit of five, so the second dense vector is padded out with zeroes. The embedding layer is a fixed size (for example 3 nodes).

Figure 9:
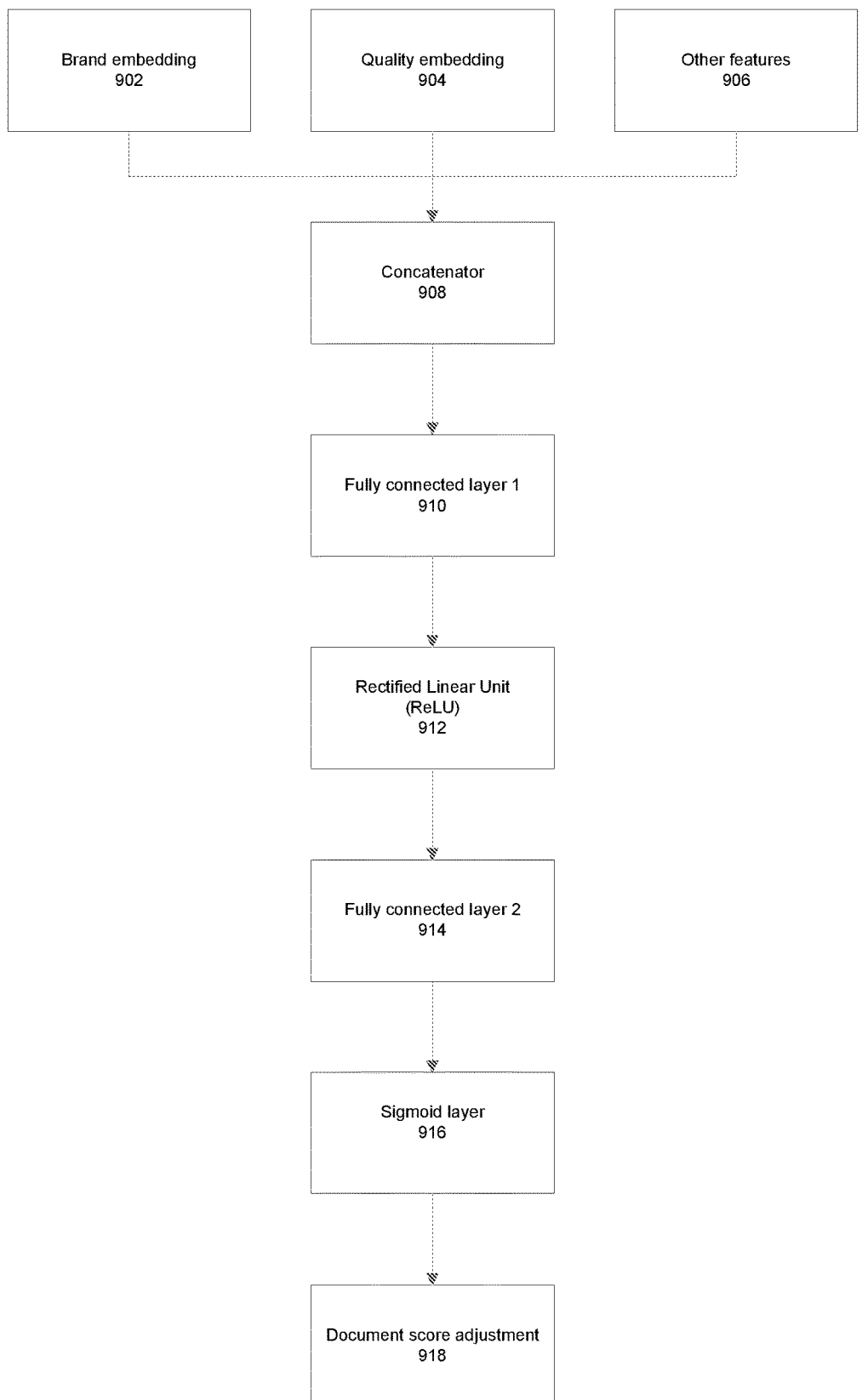
FIG. 9 illustrates an example structure for a neural network to learn document score adjustment according to the second method illustrated in FIG. 8.

The structure of the neural network is illustrated in FIG. 9.

In this example, the neural network of the adjustment model 118 is a Siamese neural network as described above. This means there are two subcomponents to the neural network: subnetwork A and subnetwork B. Each subnetwork reflects the structure as illustrated in FIG. 9, however, one aspect to note is that the subnetworks, being a Siamese neural network, share weights.

At 808, a first dense feature vector, that is the dense feature vector corresponding to a first document i, is input into subnetwork A. The second dense vector, that is the dense vector corresponding to a second document j, is input into subnetwork B.

The adjustment model module 134 then estimates 810 the score adjustment of document i from the output of subnetwork A based on the dense feature vector of document i. Similarly, the adjustment model module 134 estimates 812 the score adjustment of document j from the output of subnetwork B based on the dense feature vector of document j.

The adjustment model module 134 then determines 814 the attractiveness of document i from the document attractiveness model 126 described above. Similarly, the adjustment model module 134 then determines 816 the attractiveness of document j from the document attractiveness model 126 described above. Steps 814 and 816 may simply involve determining the entries for document pair i, j in the pairwise comparisons dataset stored in the pairwise comparisons database 116 where the pairwise comparison dataset has previously been determined.

Based on this, the adjustment model module 134 can determine 820 a target probability that document i is more attractive than document j.

The adjustment model module 134 then determines 820 the loss based on the loss function, which in this example is a cross-entropy loss, taking into account the target probability determined earlier.

The weights of subnetwork A and B are then updated 822 based on the cross-entropy loss (as described above).

At step 824, the adjustment model module 134 will determine whether the training should continue. Typically, training may occur over a small to substantial percentage of the documents in the document database. However, although possible, training may not occur over all the documents in the document database to prevent over-fitting, which may cause in spurious results in new documents.

The adjustment model module 134 may train over a single pair of documents, or a group of documents. This is referred to as a minibatch. As above, a minibatch may improve the speed at which the model can be trained.

Deep Learning Neural Network

FIG. 9 illustrates an example deep learning neural network. In this disclosure the deep learning neural network is a Siamese neural network so the illustration and description below applies to one subnetwork of the neural network. The other subnetwork is structured the same and therefore operates in the same way.

The features brand embedding, quality embedding 904 and other features 906, in this example represent an embedded layer and are the features that are determined for the documents in the document database. These features are typically determined for all the documents in the document database. Example other features are those described above, including quality of an image and whether a document (typically an image in the examples described in this disclosure) is free or paid.

As above, the features are input into a concatenator 908. This concatenator 908 generates a vector that represents all of the features are input into it.

The vector is then input into a first fully connected layer 910. This first fully connected layer 910 is much like the hidden layer 706 in the example neural network in FIG. 7. Each node in the fully connected layer produces a first intermediate value, each of which is input into an activation function called a rectifier linear unit 912 (often referred to as ReLU). It is possible that other activation functions (such as linear, sigmoid and hyperbolic tangent) can be used each of which has specific advantages and disadvantages but in this example the ReLU is used.

The ReLU 912 is a component that activates nodes according to an activation function that returns 0 if it receives any negative input, but for any positive input it returns that input. That is, the ReLU activation function can be considered to be the function: $f(x)=\max(0,x)$. In this sense a node in the first fully connected layer 910 that produces a first intermediate value that is negative will be, in effect, deactivated in that the value passed on to the remaining layers of the neural network is 0. Similarly, a node in the first fully connected layer 910 that produces a first intermediate value that is positive will be activated in that the first intermediate value will be passed on to the remaining layers. The use of the ReLU 912 helps the model deal with non-linear effects. That is, the effect of increasing a variable by one is different at different values of that variable.

The output from the ReLU activated nodes is input into a second fully connected layer 914. Again, this is much like the previous fully connected layer 910 (and similarly the hidden layer in the example neural network in FIG. 7). Each node in the second fully connected layer produces a second intermediate value, each of which is input into an activation function called a sigmoid 916. In a sigmoid activation function the input to the function is transformed into a value between 0.0 and 1.0. Inputs that are much larger than 1.0 are capped at the upper limit of 1.0, similarly, values below 0.0 are capped at the lower limit of 0.0. In this example the sigmoid layer 916 can be scaled to the range 1.0 to 1.5 by a scaling layer (not illustrated).

The end result output from the adjustment model 118 is a document score adjustment 918. As per above, during training of the adjustment model 118, this document score adjustment is input into a loss function (in this disclosure a cross-entropy loss function is used) in order to determine how to adjust the weights in the deep learning neural network.

Once the training of the adjustment model 118 is complete, it is possible to determine a score adjustment of a document by inputting the features of the document into the adjustment model 118.

Dampener Parameters

As a result of utilising the user interaction database 114, some documents may be rated as more attractive than they should be or would be expected to be. That is, free user browsing may produce user interactions that are not aligned with specific objectives (which may be for example to encourage use of specific documents such as documents with higher quality ratings). As a result, a dampener parameter can be used. This dampener parameter acts to reduce the overall contribution of a result to the weight adjustment in the network. This dampener parameter can be applied in both embodiments described above.

An example of where a dampener parameter can be used is with free and paid images. This is because the majority of users would not be subscribers to paid content and therefore would click on free images significantly more often. In this case the dampener parameter is used to effectively penalise free content to account for the fact that a majority of users would not utilise paid content and therefore a document that is, or includes, paid content would likely be determined to be less relevant in a pairwise comparison.

This is done by changing the target probability if document i is free and document j is not. A dampener parameter k is defined, which can be multiplied with the target probability, to dampen the proportion of free to paid images. There are different values of k (for example, 0.1 to 0.5) that can be used to balance results between free and paid documents.

This accounts for the fact that free images tend to dominate paid images in attractiveness; most users prefer free images not because they are truly attractive compared to a paid image, but more so because they cost nothing. Dampener parameters can be determined for other data biases or other similar discrepancies in attractiveness. The tables below illustrates a document score adjustment for free images (table 1) and paid images (table 2) where the dampener parameter is 0.5. Note that the paid images have lower document score adjustment values on average as their base scores are higher.

TABLE 1

| Free | |
|---|---|
| Document score adjustment value | Count |
| 1.0001863241195679 | 230 |
| 1.0005956888198853 | 33 |
| 1.0023924112319946 | 121 |
| 1.0075739622116089 | 4 |
| 1.0291855335235596 | 112 |
| 1.0827466249465942 | 8 |
| 1.2221081256866455 | 46 |
| 1.2667508125305176 | 551 |
| 1.3594299554824830 | 11 |
| 1.4557728767395020 | 4221 |
| 1.4682446718215942 | 905 |
| 1.4852802753448486 | 5631 |
| 1.4910130500793457 | 4 |
| 1.4973838329315186 | 1066 |
| 1.4986631870269775 | 605 |
| 1.4997961521148682 | 56765 |
| 1.4998960494995117 | 1 |
| 1.4999842643737793 | 38638 |
| 1.4999949932098389 | 33 |
| 1.4999970197677612 | 53 |

TABLE 2

| Paid | |
|---|---|
| Document score adjustment value | Count |
| 1.0000001192092896 | 32 |
| 1.0000002384185790 | 226 |
| 1.0000008344650269 | 31 |
| 1.0000013113021850 | 3 |
| 1.0000025033950806 | 83 |
| 1.0000101327896118 | 29 |
| 1.0000283718109130 | 86 |
| 1.0000323057174683 | 28 |
| 1.0001302957534790 | 62242 |
| 1.0001863241195679 | 6098 |
| 1.0002158880233765 | 50 |
| 1.0003656148910522 | 191 |
| 1.0004165172576904 | 303241 |
| 1.0006898641586304 | 214 |
| 1.0016744136810303 | 374648 |
| 1.0023924112319946 | 31484 |
| 1.0027688741683960 | 2429 |
| 1.0046726465225220 | 17401 |
| 1.0053175687789917 | 910976 |
| 1.0087512731552124 | 8406 |
| 1.0291855335235596 | 372231 |
| 1.0542206764221191 | 48870 |
| 1.2221081256866455 | 2398044 |
| 1.3053148984909058 | 1216 |
| 1.4557728767395020 | 3645724 |

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A computer-implemented method for determining a score adjustment to a base score generated for a search document, wherein the base score is generated by a search engine based on a search query, wherein the method comprises:
   determining a first attractiveness model of a first document from one or more documents based on one or more user interactions associated with the first document, wherein the search query is not used to determine the first attractiveness model;
   determining a second attractiveness model of a second document from one or more documents based on one or more user interactions associated with the second document, wherein the search query is not used to determine the second attractiveness model;
   determining one or more pairwise comparisons of documents based on the first and second attractiveness models of the first and second documents;
   training an adjustment model based on the pairwise comparisons of documents; and
   inputting the search document into the adjustment model to determine the score adjustment.

2. The computer-implemented method of claim 1, wherein the adjustment model is a neural network.

3. The computer-implemented method of claim 2, wherein the neural network is a symmetrical neural network.

4. The computer-implemented method of claim 3, wherein the symmetrical neural network is a Siamese neural network comprising a first subnetwork and a second subnetwork and wherein each of the first subnetwork and second subnetwork share weights.

5. The computer-implemented method of claim 4, wherein training the neural network comprises adjusting the weights of the neural network using a cross-entropy loss function.

6. The computer-implemented method of claim 5, wherein training the Siamese neural network comprises inputting a first document into the first subnetwork and inputting a second document into the second network to calculate the cross-entropy loss based on the cross-entropy loss function.

7. The computer-implemented method of claim 1, wherein determining the one or more pairwise comparisons comprises determining a probability of a hypothesis of a comparison between an attractiveness of the first document based on the first attractiveness model and an attractiveness of the second document based on the second attractiveness model.

8. The computer-implemented method of claim 1, wherein the first attractiveness model is based on clicks of the first document in a search result produced by a query.

9. The computer-implemented method of claim 1, wherein the second attractiveness model is based on clicks of the second document in a search result produced by a query.

10. The computer-implemented method of claim 1 wherein the attractiveness model is based on a beta random variable.

11. The computer-implemented method of claim 10 wherein the attractiveness model is based on the Beta-Bernoulli model.

12. The computer-implemented method of claim 1 wherein the attractiveness model is based on a Gaussian random variable.

13. The computer-implemented method of claim 1, wherein inputting the search document into the adjustment model comprises determining one of more document features of the search document.

14. The computer-implemented method of claim 13 wherein the search document is an image and wherein the document features comprise one or more of:
   whether the image is a cutout;
   whether an object in the image is a single, isolated object;
   whether the image supports being placed in a photoholder;
   whether the image can be recoloured;
   whether the image should be rescaled or repeated if enlarged;
   whether the image is free or paid;
   whether the image is a raster image or a vector image; and
   a measurement of the quality of the image.

15. The computer-implemented method of claim 1, wherein the adjustment model is a deep learning neural network.

16. The computer-implemented method of claim 15, wherein the adjustment model comprises a first fully connected layer and a second fully connected layer.

17. The computer-implemented method of claim 16, wherein the adjustment model comprises a rectifier linear unit activation function between the first fully connected layer and the second fully connected layer.

18. The computer-implemented method of claim 16, wherein the adjustment model comprises a sigmoid layer connected to the second fully connected layer.

19. The computer-implemented method of claim 1 wherein the adjustment model comprises a dampening parameter.

20. A computer processing system comprising:
   a processing unit;
   a communication interface;
   a non-transient storage medium readable by a processor, the storage medium storing instructions executable by one or more processors to cause the one or more processors to perform a method for determining a score adjustment to a base score generated for a search document, wherein the base score is generated by a search engine based on a search query, wherein the method comprises:
     determining a first attractiveness model of a first document from one or more documents based on one or more user interactions associated with the first document, wherein the search query is not used to determine the first attractiveness model;
     determining a second attractiveness model of a second document from one or more documents based on one or more user interactions associated with the second document, wherein the search query is not used to determine the second attractiveness model;
     determining one or more pairwise comparisons of documents based on the first and second attractiveness models of the first and second documents;

training an adjustment model based on the pairwise comparisons of documents; and inputting a search document into the adjustment model to determine the score adjustment for the search document.

\* \* \* \* \*